US012634044B2

(12) United States Patent
Li

(10) Patent No.: US 12,634,044 B2
(45) Date of Patent: May 19, 2026

(54) UPLINK TRANSMISSION METHOD AND APPARATUS, ACCESS NETWORK DEVICE, TERMINAL, AND STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 644 days.

(21) Appl. No.: 17/997,992

(22) PCT Filed: May 7, 2020

(86) PCT No.: PCT/CN2020/089031
§ 371 (c)(1),
(2) Date: Nov. 4, 2022

(87) PCT Pub. No.: WO2021/223175
PCT Pub. Date: Nov. 11, 2021

(65) Prior Publication Data
US 2023/0179336 A1    Jun. 8, 2023

(51) Int. Cl.
*H04L 1/1812*        (2023.01)
*H04W 72/21*        (2023.01)

(52) U.S. Cl.
CPC ........... *H04L 1/1812* (2013.01); *H04W 72/21* (2023.01)

(58) Field of Classification Search
CPC ..................................................... H04L 1/1812
See application file for complete search history.

(56) References Cited

U.S. PATENT DOCUMENTS

| | | | |
|---|---|---|---|
| 8,248,973 B2 * | 8/2012 | Chiu | H04L 1/1822 370/320 |
| 8,392,781 B2 | 3/2013 | Batra et al. | |
| 8,432,794 B2 * | 4/2013 | Terry | H04L 1/1893 370/236 |
| 10,673,572 B2 | 6/2020 | Quan et al. | |
| 10,716,122 B2 | 7/2020 | Holakouei et al. | |
| 2006/0092973 A1 * | 5/2006 | Petrovic | H04L 1/1841 370/208 |
| 2009/0300456 A1 * | 12/2009 | Pelletier | H04L 5/0005 714/748 |

(Continued)

FOREIGN PATENT DOCUMENTS

| | | |
|---|---|---|
| CN | 101841399 A | 9/2010 |
| CN | 102484569 A | 5/2012 |

(Continued)

OTHER PUBLICATIONS

International Search Report with English translation mailed on Jan. 28, 2021 in PCT/CN2020/089031 filed on May 7, 2020 (citing references 1-6 & 8-12 therein, 4 pages).

(Continued)

*Primary Examiner* — Guang W Li
(74) *Attorney, Agent, or Firm* — Oblon, McClelland, Maier & Neustadt, L.L.P.

(57) ABSTRACT

Aspects of the disclosure are directed to an uplink transmission method. The method can include receiving the same uplink transmission sent by a terminal by means of a plurality of HARQ processes, and combining uplink transmissions sent by the plurality of HARQ processes.

10 Claims, 4 Drawing Sheets

201

Determine, by a terminal, an uplink transmission to be transmitted

202

Send, by the terminal, the uplink transmission to be transmitted to an access network device through a plurality of HARQ processes

(56) References Cited

U.S. PATENT DOCUMENTS

| | | | | |
|---|---|---|---|---|
| 2010/0180173 | A1 | 7/2010 | Batra et al. | |
| 2010/0275083 | A1* | 10/2010 | Nam | H04W 72/20 |
| | | | | 714/E11.131 |
| 2010/0312994 | A1* | 12/2010 | McBeath | H04L 5/0042 |
| | | | | 712/E9.016 |
| 2010/0322177 | A1 | 12/2010 | Luo et al. | |
| 2011/0164664 | A1* | 7/2011 | Torsner | H04L 1/1887 |
| | | | | 375/295 |
| 2011/0194499 | A1* | 8/2011 | Aiba | H04L 5/001 |
| | | | | 370/328 |
| 2012/0320853 | A1* | 12/2012 | Kwon | H04L 1/0067 |
| | | | | 370/329 |
| 2014/0321418 | A1* | 10/2014 | Rinne | H04L 1/1812 |
| | | | | 370/329 |
| 2015/0085796 | A1* | 3/2015 | Xu | H04L 1/1819 |
| | | | | 370/329 |
| 2015/0264708 | A1* | 9/2015 | Li | H04L 1/1887 |
| | | | | 370/329 |
| 2017/0289995 | A1* | 10/2017 | Lin | H04W 72/0446 |
| 2019/0165897 | A1* | 5/2019 | Lin | H04L 1/1822 |
| 2020/0177322 | A1 | 6/2020 | Xu et al. | |
| 2020/0259598 | A1* | 8/2020 | Quan | H04L 1/04 |
| 2022/0216955 | A1* | 7/2022 | Kim | H04W 72/23 |

FOREIGN PATENT DOCUMENTS

| | | |
|---|---|---|
| CN | 106797285 A | 5/2017 |
| CN | 107027180 A | 8/2017 |
| CN | 107210840 A | 9/2017 |
| CN | 108141324 A | 6/2018 |
| CN | 109075919 A | 12/2018 |
| CN | 110971348 A | 4/2020 |
| CN | 111049626 A | 4/2020 |
| WO | WO 2010/105539 A1 | 9/2010 |
| WO | WO 2017/015963 A1 | 2/2017 |
| WO | WO 2020/056645 A1 | 3/2020 |

OTHER PUBLICATIONS

Chinese First Office Action with English translation mailed on Mar. 17, 2021 in Chinese Application No. 2020800009442 filed on Jun. 10, 2020 (citing references 5, 9-12 & 19 therein, 15 pages).

Chinese Notice of Acceptance with English translation mailed on Mar. 2, 2022 in Chinese Application No. 2020800009442 filed on Jun. 10, 2020 (citing references 7 & 13-18 therein, 8 pages).

* cited by examiner

UPLINK TRANSMISSION METHOD AND APPARATUS, ACCESS NETWORK DEVICE, TERMINAL, AND STORAGE MEDIUM

CROSS REFERENCE TO RELATED APPLICATIONS

The present application is the U.S. National Stage of International Application No. PCT/CN2020/089031, filed on May 7, 2020, the contents of all of which are incorporated herein by reference in their entireties for all purposes.

BACKGROUND OF THE INVENTION

Field of the Invention

The present disclosure relates to the field of communication technologies, and in particular, to an uplink transmission method and apparatus, an access network device, a terminal and a storage medium.

Description of the Related Art

Hybrid Automatic Repeat reQuest (HARQ) is a technology that combines Forward Error Correction (FEC) and Automatic Repeat reQuest (ARQ). In cellular communication systems, signal transmission may fail due to influences of time-varying characteristics and multipath fading of wireless channels on the signal transmission, as well as some unpredictable interferences, and thus, the HARQ technology is used for error control to ensure transmission quality.

SUMMARY OF THE INVENTION

Embodiments of the present disclosure provide an uplink transmission method and apparatus, an access network device, a terminal and a storage medium.

According to a first aspect of the present disclosure, there is provided an uplink transmission method, and the method includes receiving identical uplink transmissions sent by a terminal through a plurality of HARQ processes, and combining the uplink transmissions sent through the plurality of HARQ processes.

According to a second aspect of the present disclosure, there is provided an uplink transmission method, and the method includes determining an uplink transmission to be transmitted, and sending the uplink transmission to be transmitted through a plurality of HARQ processes, wherein the uplink transmission transmitted through the plurality of HARQ processes is the same.

According to a third aspect of the present disclosure, there is provided an access network device, including a processor and a memory configured to store executable instructions of the processor. The processor being configured to load and execute the executable instructions to implement the uplink transmission method described above.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and, together with the specification, serve to explain principles of the present disclosure.

DETAILED DESCRIPTION OF THE PREFERRED EMBODIMENTS

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with some aspects related to the present disclosure as recited in the appended claims.

Figure 1:
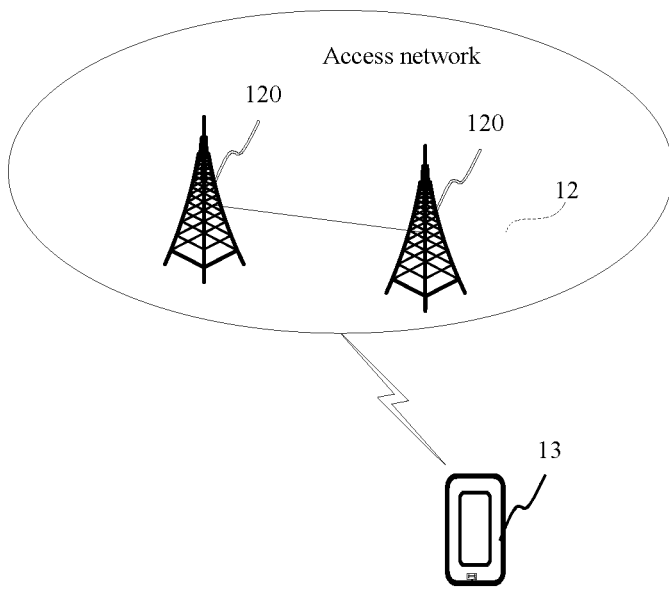
FIG. 1 shows a block diagram of a communication system provided by an embodiment of the present disclosure.

FIG. 1 shows a block diagram of a communication system provided by an embodiment of the present disclosure, and as shown in FIG. 1, the communication system may include an access network 12 and a terminal 13.

The access network 12 includes several access network devices 120. The access network device 120 may be a base station, and the base station is a device deployed in the access network and for providing a wireless communication function to the terminal. The base stations may include various forms of macro base stations, micro base stations, relay stations, access points, and the like. In systems adopting different radio access technologies, a device equipped with functions of the base station may have different names, and in a 5G New Radio (NR) system, it is called as gNodeB or gNB. The name "base station" may change with the evolution of communication technologies. For the sake of easy description, the device that provides the wireless communication function to the terminal is collectively called as the access network device in the following.

The terminal 13 may include various handheld devices with wireless communication functions, vehicle-mounted devices, wearable devices, computing devices or other processing devices connected to a wireless modem, as well as various forms of User Equipment (UE), Mobile Stations (MS), terminal devices, etc. For ease of description, the above-mentioned devices are collectively referred to as terminals. The access network device 120 and the terminal 13 communicate with each other through a certain air interface technology, such as a Uu interface.

In the NR system, in order to reduce the complexity of terminal implementation, NR R15 only supports sequential HARQ scheduling. Moreover, for an uplink transmission, the access network device will not feed back Acknowledgment (ACK)/Negative Acknowledgment (NACK) information to the terminal, but directly indicate the terminal whether to perform data retransmission through new/old data indication in scheduling signaling, and the retransmission can only be done in the same process. Therefore, in an uplink transmission process, the terminal needs to experience a process of sending a Physical Uplink Shared Channel (PUSCH), waiting for a Physical Downlink Control Channel (PDCCH), and then sending PUSCH retransmission.

This uplink transmission process increases the uplink transmission latency. In addition, in the above process, the retransmission and combination of data are both carried out in one process. However, when the terminal is in a scenario with limited coverage (for example, the terminal is located at a cell edge), if all data blocks transmitted by one process are wrong, it is difficult to guarantee the accuracy of the combined data even if the retransmission is performed.

The communication system and service scenarios described in the embodiments of the present disclosure are to explain the technical solutions of the embodiments of the present disclosure more clearly, and do not constitute a limitation to the technical solutions provided in the embodiments of the present disclosure. Those skilled in the art may know that the technical solutions provided in the embodiments of the present disclosure are equally applicable to similar technical problems as the communication system evolves and new service scenarios appear.

Figure 2:
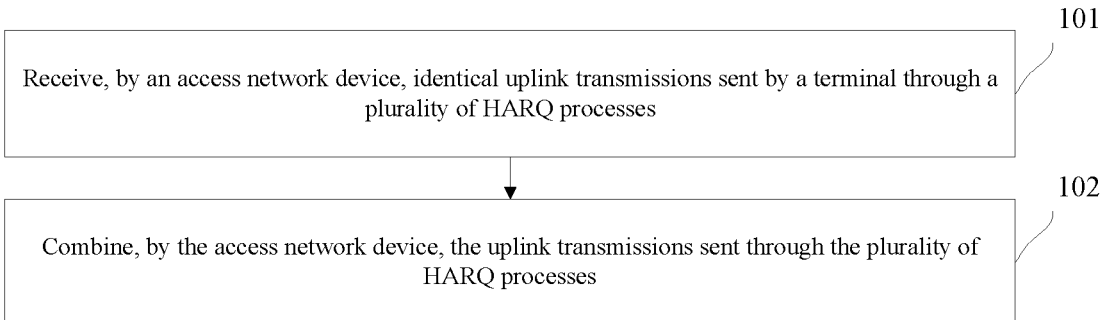
FIG. 2 is a flowchart showing an uplink transmission method according to an embodiment.

FIG. 2 is a flowchart showing an uplink transmission method according to an embodiment, and referring to FIG. 2, the method includes the following steps 101 to 102.

In the step 101, an access network device receives identical uplink transmissions sent by a terminal through a plurality of HARQ processes. Here, the HARQ process refers to a process in which the access network device performs the retransmission of the uplink transmission one time through scheduling. The plurality of HARQ processes here are concurrent. In the embodiments of the present disclosure, the access network device simultaneously schedules and generates the plurality of HARQ processes to transmit the same data packet.

In the step 102, the access network device combines the uplink transmissions sent through the plurality of HARQ processes. In the embodiments of the present disclosure, the uplink transmission may be any of the following: data transmission, signaling transmission, and mixed transmission of data and signaling, that is, the uplink transmission may be any transmission.

The access network device performs cross-process soft combining and decoding on the uplink transmissions sent through the plurality of HARQ processes. Since there may be a missing or error problem in a single uplink transmission, a probability of correct decoding of information is improved through the soft combining and decoding of a plurality of uplink transmissions.

In the embodiments of the present disclosure, the access network device simultaneously schedules and generates the plurality of HARQ processes to transmit the identical uplink transmissions, and combines the uplink transmissions sent through the plurality of HARQ processes to improve the probability of correct decoding of information. In this way, on the one hand, the transmission latency can be reduced, and on the other hand, the uplink transmission quality can be improved, thereby enhancing the coverage of an uplink service channel.

Optionally, the combining the uplink transmissions sent through the plurality of HARQ processes includes determining HARQ processes belonging to the same HARQ process bundle, and combining the uplink transmissions sent through the HARQ processes belonging to the same HARQ process bundle.

In the embodiments of the present disclosure, HARQ processes supported by the terminal are divided into HARQ process bundles, and the HARQ processes in the same HARQ process bundle can schedule the same uplink transmission. Therefore, the access network device only needs to determine that the HARQ processes belong to the same HARQ process bundle, and then the access network device can combine the uplink transmissions transmitted through these HARQ processes.

In the embodiments of the present disclosure, the HARQ process bundle may be configured in various manners. For example, the access network device and the terminal each determines the configuration of the HARQ process bundle through a protocol. The configuration of the HARQ process bundle can also be determined by the access network device and then notified to the terminal, for example, the configuration of the HARQ process bundle is determined by the access network device through the protocol, and then notified to the terminal. Alternatively, the HARQ process bundle may also be configured by the access network device according to a network condition, and then notified to the terminal.

For example, the access network device may determine the number of HARQ processes in one HARQ process bundle according to a terminal performance, then divide the corresponding number of HARQ processes into one HARQ process bundle, and indicate the same to the terminal.

For example, the worse the terminal performance, the more the number of HARQ processes included in one HARQ process bundle. In this way, on the one hand, the transmission quality is ensured, and on the other hand, the transmission latency is reduced. On the contrary, the better the terminal performance, the smaller the number of HARQ processes included in one HARQ process bundle.

Optionally, the method may further include sending a control instruction for indicating the HARQ processes belonging to the same HARQ process bundle to the terminal. One HARQ process bundle may include one or more HARQ processes, and the number of HARQ processes in one HARQ process bundle may be one by default. Only when the solution provided by the embodiments of the present disclosure is applied, the number of HARQ processes in one HARQ process bundle is configured to be two or more.

In the embodiments of the present disclosure, there are also a plurality of manners for the access network device to indicate the HARQ processes belonging to the same HARQ process bundle to the terminal.

In some embodiments of the present disclosure, the control instruction includes a HARQ process bundle size, and the HARQ process bundle size is used to indicate the terminal to divide the plurality of HARQ processes into at least one HARQ process bundle according to the HARQ process bundle size.

In this implementation, the control instruction only indicates the process bundle size, such as 2, 4, 8, 16, or 1, 2, 3, 4, 5, etc., and the default value of the process bundle size is 1. After receiving the control instruction, the terminal can divide the corresponding number of HARQ processes into one HARQ process bundle starting from a set HARQ process based on this value. For example, starting from HARQ process 0, two HARQ processes of HARQ process 0 and HARQ process 1 are divided into one HARQ process bundle.

In some embodiments of the present disclosure, the control instruction includes HARQ process numbers belonging to the same HARQ process bundle. For example, the control instruction directly indicates that HARQ process 0 and HARQ process 1 belong to the same HARQ process bundle.

In some embodiments of the present disclosure, the control instruction includes indicating an uplink transmission transmitted by a HARQ process and the HARQ processes transmitting the identical uplink transmissions belonging to the same HARQ process bundle. For example, the access network device directly indicates the terminal to transmit what uplink transmission on each HARQ process, and the HARQ processes that transmit the same uplink transmission belong to the same HARQ process bundle, which notification manner actually implies information of the HARQ processes belonging to the same HARQ process bundle.

Optionally, the sending the control instruction for indicating the HARQ processes belonging to the same HARQ process bundle to the terminal includes sending a PDCCH carrying the control instruction to the terminal.

Optionally, the sending the PDCCH carrying the control instruction to the terminal includes sending the PDCCH to the terminal in the plurality of HARQ processes, respectively, and the control instruction carried by the PDCCH sent in the plurality of HARQ processes indicates the terminal to transmit the same uplink transmission.

For example, in PDCCH 0 scheduling signaling, it is indicated that HARQ process 0 transmits an uplink transmission A, and in PDCCH 1 scheduling signaling, it is indicated that HARQ process 1 also transmits the uplink transmission A. In this case, HARQ process 0 and HARQ process 1 belong to the same HARQ process bundle.

Optionally, new/old data indication in the PDCCH sent in the plurality of HARQ processes is the same, and the new/old data indication is used to indicate that the transmitted uplink transmission is a new uplink transmission or a retransmitted uplink transmission. For example, when the plurality of HARQ processes in the same HARQ process bundle retransmit the uplink transmission A, the new/old data indication (NDI) is all identified as 1, which is used to indicate the retransmission of the uplink transmission. However, when the plurality of HARQ processes transmit the new uplink transmission, the new/old data indication is all identified as 0. Please note that an opposite indication manner or other indication manners may also be used, as long as indication manners of the plurality of HARQ processes are consistent.

It should be noted that the foregoing steps 101 to 102 and the above-mentioned optional steps may be combined arbitrarily.

Figure 3:
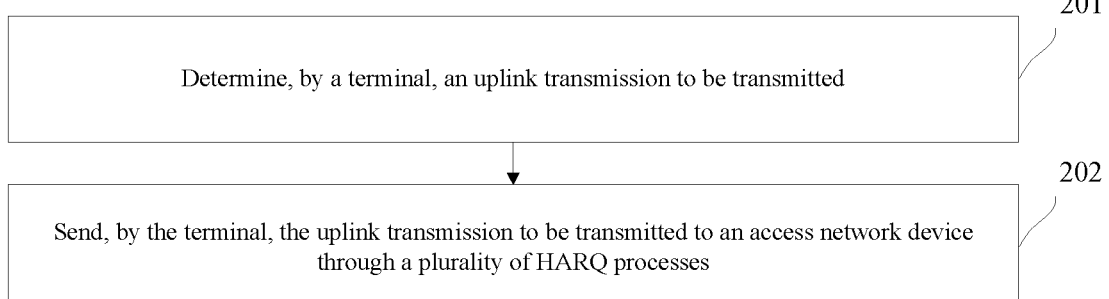
FIG. 3 is a flowchart showing an uplink transmission method according to an embodiment.

FIG. 3 is a flowchart showing an uplink transmission method according to an embodiment, and referring to FIG. 3, the method includes the following steps:

in step 201, a terminal an uplink transmission to be transmitted; and in step 202, the terminal sends the uplink transmission to be transmitted through a plurality of HARQ processes to an access network device, and the uplink transmission transmitted through the plurality of HARQ processes is the same.

Here, the HARQ process refers to a process in which the access network device performs the retransmission of the uplink transmission one time through scheduling. The plurality of HARQ processes here are concurrent. In the embodiments of the present disclosure, the access network device simultaneously schedules and generates the plurality of HARQ processes to transmit the same uplink transmission.

In the embodiments of the present disclosure, the access network device simultaneously schedules and generates the plurality of HARQ processes to transmit the identical uplink transmissions, and combines the uplink transmissions sent through the plurality of HARQ processes to improve the probability of correct decoding of information. In this way, on the one hand, the transmission latency can be reduced, and on the other hand, the uplink transmission quality can be improved, thereby enhancing the coverage of an uplink service channel.

Optionally, the sending the uplink transmission to be transmitted through the plurality of HARQ processes to the access network device includes determining HARQ processes belonging to the same HARQ process bundle, and sending the uplink transmission to be transmitted through the HARQ processes belonging to the same HARQ process bundle to the access network device.

Optionally, the determining the HARQ processes belonging to the same HARQ process bundle includes receiving a control instruction for indicating the HARQ processes belonging to the same HARQ process bundle sent by the access network device.

Optionally, the control instruction includes a HARQ process bundle size, and the HARQ process bundle size is used to indicate the terminal to divide the plurality of HARQ processes into at least one HARQ process bundle according to the HARQ process bundle size, or the control instruction includes HARQ process numbers belonging to the same HARQ process bundle, or the control instruction includes indicating an uplink transmission transmitted by a HARQ process and the HARQ processes transmitting the identical uplink transmissions belonging to the same HARQ process bundle.

Optionally, the receiving the control instruction for indicating the HARQ processes belonging to the same HARQ process bundle sent by the access network device includes receiving a PDCCH carrying the control instruction sent by the access network device.

Optionally, the receiving the PDCCH carrying the control instruction sent by the access network device includes receiving the PDCCH sent by the access network device in the plurality of HARQ processes, respectively, and the control instruction carried by the PDCCH sent in the plurality of HARQ processes indicates the terminal to transmit the same uplink transmission.

Optionally, new/old data indication in the PDCCH sent in the plurality of HARQ processes is the same, and the new/old data indication is used to indicate that the transmitted uplink transmission is a new uplink transmission or a retransmitted uplink transmission.

It should be noted that the foregoing steps 201 to 202 and the above-mentioned optional steps may be combined arbitrarily.

Figure 4:
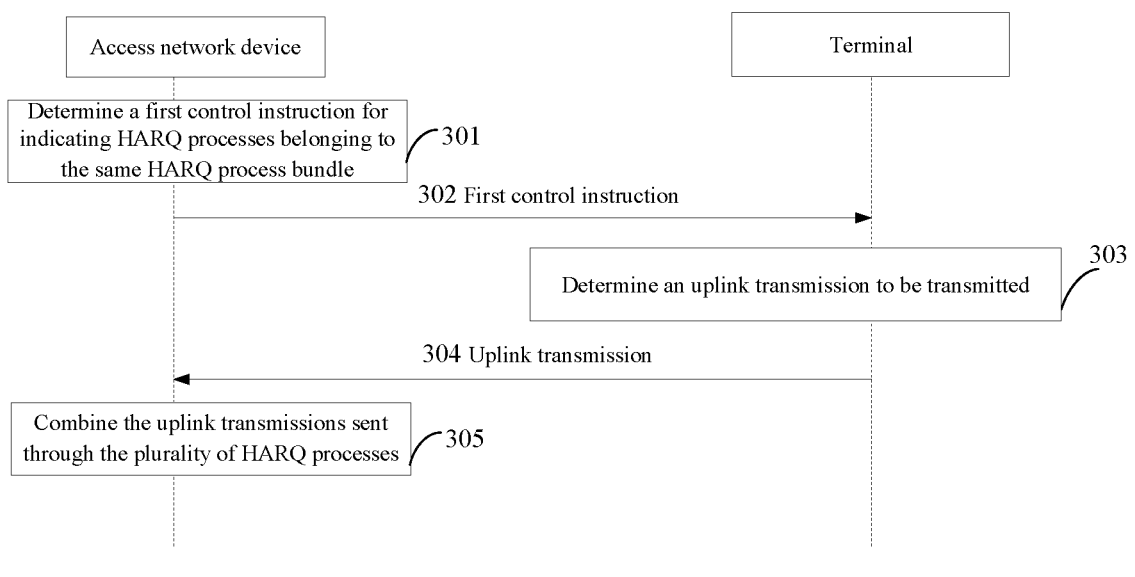
FIG. 4 is a flowchart showing an uplink transmission method according to an embodiment.

FIG. 4 is a flowchart showing an uplink transmission method according to an embodiment, and referring to FIG. 4, the method includes the following steps 301 to 305.

In the step 301, the access network device determines a first control instruction for indicating HARQ processes belonging to the same HARQ process bundle.

One HARQ process bundle may include one or more HARQ processes, and the number of HARQ processes in one HARQ process bundle may be one by default. Only when the solution provided by the embodiments of the present disclosure is adopted, the number of HARQ processes in one HARQ process bundle is configured to be two or more.

In the embodiments of the present disclosure, there are also a plurality of manners for the access network device to indicate the HARQ processes belonging to the same HARQ process bundle to the terminal.

In some embodiments of the present disclosure, the first control instruction includes a HARQ process bundle size, and the HARQ process bundle size is used to indicate the terminal to divide the plurality of HARQ processes into at least one HARQ process bundle according to the HARQ process bundle size.

In this implementation, the first control instruction only indicates the process bundle size, such as 2, 4, 8, 16, or 1, 2, 3, 4, 5, etc., and the default value of the process bundle size is 1. After receiving the first control instruction, the terminal can divide the corresponding number of HARQ processes into one HARQ process bundle starting from a set HARQ process based on this value. For example, starting from HARQ process 0, two HARQ processes of HARQ process 0 and HARQ process 1 are divided into one HARQ process bundle.

In some embodiments of the present disclosure, the first control instruction includes HARQ process numbers belonging to the same HARQ process bundle. For example, the first control instruction directly indicates that HARQ process 0 and HARQ process 1 belong to the same HARQ process bundle. It should be noted that, the method for using the plurality of HARQ processes to perform the same uplink transmission provided by the present disclosure can be configured on the access network device to activate or deactivate the function, and only in the activated state, the steps 301 to 305 are performed.

In the step 302, the access network device sends the first control instruction, and the terminal receives the first control instruction. For example, the access network device sends the PDCCH carrying the first control instruction to the terminal.

Optionally, new/old data indication in the PDCCH sent in the plurality of HARQ processes is the same, and the new/old data indication is used to indicate that the transmitted uplink transmission is a new uplink transmission or a retransmitted uplink transmission. For example, when the plurality of HARQ processes in the same HARQ process bundle retransmit the uplink transmission A, the new/old data indication (NDI) is all identified as 1, which is used to indicate the retransmission of the uplink transmission. However, when the plurality of HARQ processes transmit the new uplink transmission, the new/old data indication is all identified as 0. Please note that an opposite indication manner or other indication manners may also be used, as long as indication manners of the plurality of HARQ processes are consistent.

In the step 303, the terminal determines the uplink transmission to be transmitted. Here, the uplink transmission to be transmitted is an uplink transmission that needs to be transmitted by using HARQ.

In the step 304, the terminal sends the uplink transmission to be transmitted to the access network device through the plurality of HARQ processes, and the access network device receives the identical uplink transmissions sent by the terminal through the plurality of HARQ processes. Here, the HARQ process refers to a process in which the access network device performs the retransmission of the uplink transmission one time through scheduling. The plurality of HARQ processes here are concurrent. In the embodiments of the present disclosure, the access network device simultaneously schedules and generates the plurality of HARQ processes to transmit the same uplink transmission.

In the step 305, the access network device combines the uplink transmissions sent through the plurality of HARQ processes. The access network device performs cross-process soft combining and decoding on the uplink transmissions sent through the plurality of HARQ processes. Since there may be a missing or error problem in a single uplink transmission, a probability of correct decoding of information is improved through the soft combining and decoding of a plurality of uplink transmissions.

Figure 5:
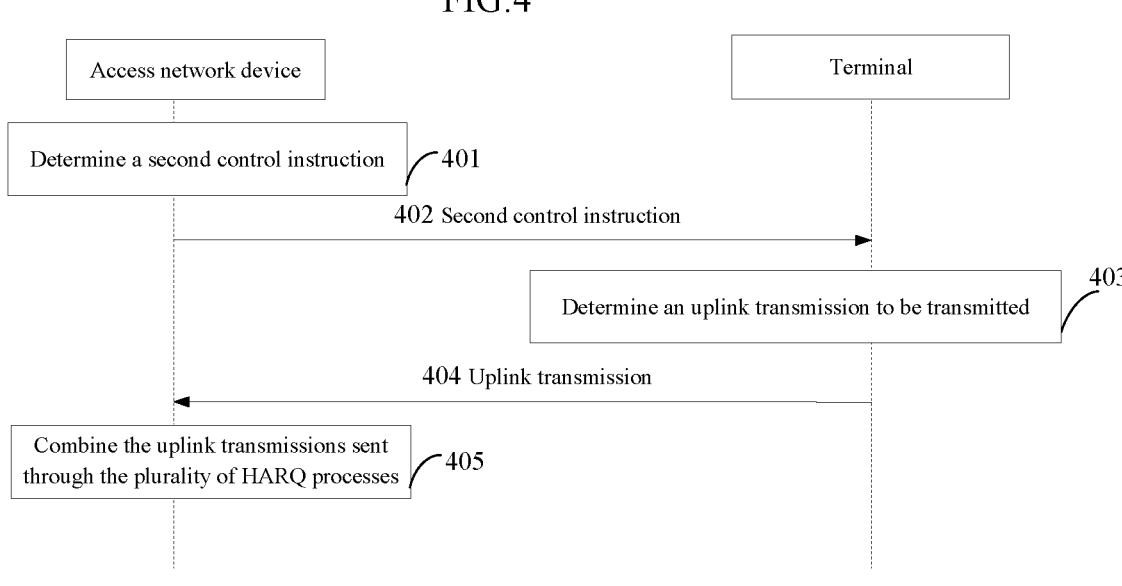
FIG. 5 is a flowchart showing an uplink transmission method according to an embodiment.

FIG. 5 is a flowchart showing an uplink transmission method according to an embodiment, and referring to FIG. 5, the method includes the following steps 401 to 405.

In the step 401, the access network device determines a second control instruction, and the second control instruction includes indicating an uplink transmission transmitted by a HARQ process and the HARQ processes transmitting the identical uplink transmissions belonging to the same HARQ process bundle.

For example, the access network device directly indicates the terminal to transmit what uplink transmission on each HARQ process, and the HARQ processes that transmit the same uplink transmission belong to the same HARQ process bundle, which notification manner actually implies information of the HARQ processes belonging to the same HARQ process bundle.

It should be noted that, the method for using the plurality of HARQ processes to perform the same uplink transmission provided by the present disclosure can be configured on the access network device to activate or deactivate the function, and only in the activated state, the steps 401 to 405 are performed.

In the step 402, the access network device sends the second control instruction, and the terminal receives the second control instruction. For example, the access network device sends the PDCCH carrying the second control instruction to the terminal.

The PDCCH is sent to the terminal in the plurality of HARQ processes, respectively, and the second control instruction carried by the PDCCH sent in the plurality of HARQ processes indicates the terminal to transmit the same uplink transmission. For example, in PDCCH 0 scheduling signaling, it is indicated that HARQ process 0 transmits an uplink transmission A, and in PDCCH 1 scheduling signaling, it is indicated that HARQ process 1 also transmits the uplink transmission A. In this case, HARQ process 0 and HARQ process 1 belong to the same HARQ process bundle.

Optionally, new/old data indication in the PDCCH sent in the plurality of HARQ processes is the same, and the new/old data indication is used to indicate that the transmitted uplink transmission is a new uplink transmission or a retransmitted uplink transmission. For example, when the plurality of HARQ processes in the same HARQ process bundle retransmit the uplink transmission A, the new/old data indication (NDI) is all identified as 1, which is used to indicate the retransmission of the uplink transmission. However, when the plurality of HARQ processes transmit the new uplink transmission, the new/old data indication is all identified as 0. Please note that an opposite indication manner or other indication manners may also be used, as long as indication manners of the plurality of HARQ processes are consistent.

In the step 403, the terminal determines the uplink transmission to be transmitted. Here, the uplink transmission to be transmitted is an uplink transmission indicated in the second control instruction.

In the step 404, the terminal sends the uplink transmission to be transmitted to the access network device through the plurality of HARQ processes, and the access network device receives the identical uplink transmissions sent by the terminal through the plurality of HARQ processes. For details of the step 404, reference may be made to the step 304.

In the step 405, the access network device combines the uplink transmissions sent through the plurality of HARQ processes. For details of the step 405, reference may be made to the step 305.

Figure 6:
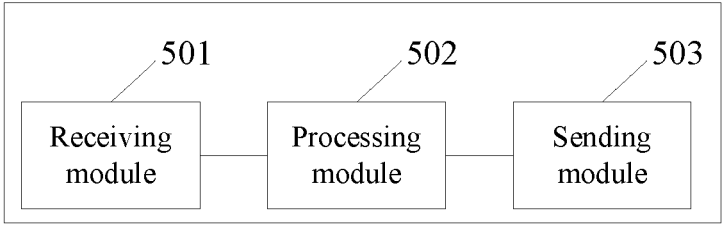
FIG. 6 is a schematic structural diagram showing an uplink transmission apparatus according to an embodiment.

FIG. 6 is a schematic structural diagram showing an uplink transmission apparatus according to an embodiment. The apparatus has functions of implementing the access network device in the above method embodiments, and the functions may be implemented by hardware or by executing corresponding software by hardware. As shown in FIG. 6, the apparatus includes a receiving module 501 and a processing module 502.

The receiving module 501 is configured to receive identical uplink transmissions sent by a terminal through a plurality of HARQ processes, and the processing module 502 is configured to combine the uplink transmissions sent through the plurality of HARQ processes.

Optionally, the processing module 502 is configured to determine HARQ processes belonging to the same HARQ process bundle; and combine the uplink transmissions sent through the HARQ processes belonging to the same HARQ process bundle.

Optionally, the apparatus further includes a sending module 503, configured to send a control instruction for indicating the HARQ processes belonging to the same HARQ process bundle to the terminal.

Optionally, the control instruction includes a HARQ process bundle size, and the HARQ process bundle size is used to indicate the terminal to divide the plurality of HARQ processes into at least one HARQ process bundle according to the HARQ process bundle size, the control instruction includes HARQ process numbers belonging to the same HARQ process bundle, or the control instruction includes indicating an uplink transmission transmitted by a HARQ process and the HARQ processes transmitting the identical uplink transmissions belonging to the same HARQ process bundle.

Optionally, the sending module 503 is configured to send a PDCCH carrying the control instruction to the terminal. Optionally, the sending module 503 is configured to send the PDCCH to the terminal in the plurality of HARQ processes, respectively, and the control instruction carried by the PDCCH sent in the plurality of HARQ processes indicates the terminal to transmit the identical uplink transmissions. Optionally, new/old data indication in the PDCCH sent in the plurality of HARQ processes is the same, and the new/old data indication is used to indicate that an uplink transmission that is transmitted is a new uplink transmission or a retransmitted uplink transmission.

Figure 7:
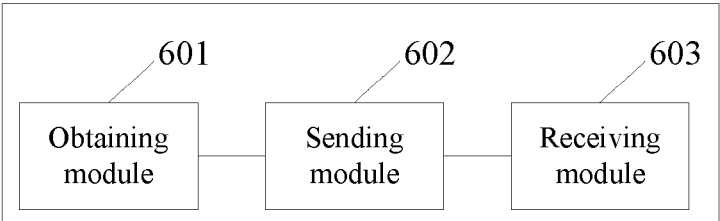
FIG. 7 is a schematic structural diagram showing an uplink transmission apparatus according to an embodiment.

FIG. 7 is a schematic structural diagram showing an uplink transmission apparatus according to an embodiment. The apparatus has functions of implementing the terminal in the above method embodiments, and the functions may be implemented by hardware or by executing corresponding software by hardware. As shown in FIG. 7, the apparatus includes an obtaining module 601 and a sending module 602.

The obtaining module 601 is configured to determine an uplink transmission to be transmitted, and the sending module 602 is configured to send the uplink transmission to be transmitted through a plurality of HARQ processes, and the uplink transmission transmitted through the plurality of HARQ processes is the same.

Optionally, the sending module 602 is configured to determine HARQ processes belonging to the same HARQ process bundle, and send the uplink transmission to be transmitted to an access network device through the HARQ processes belonging to the same HARQ process bundle.

Optionally, the apparatus further includes a receiving module 603, configured to receive a control instruction for indicating the HARQ processes belonging to the same HARQ process bundle sent by the access network device.

Optionally, the control instruction includes a HARQ process bundle size, and the HARQ process bundle size is used to indicate a terminal to divide the plurality of HARQ processes into at least one HARQ process bundle according to the HARQ process bundle size, the control instruction includes HARQ process numbers belonging to the same HARQ process bundle; or the control instruction includes indicating an uplink transmission transmitted by a HARQ process and the HARQ processes transmitting the identical uplink transmissions belonging to the same HARQ process bundle.

Optionally, the receiving module 603 is configured to receive a PDCCH carrying the control instruction sent by the access network device. Optionally, the receiving module 603 is configured to receive the PDCCH in the plurality of HARQ processes sent by the access network device, respectively, and the control instruction carried by the PDCCH sent in the plurality of HARQ processes indicates a terminal to transmit the identical uplink transmissions. Optionally, new/old data indication in the PDCCH sent in the plurality of HARQ processes is the same, and the new/old data indication is used to indicate that the transmitted uplink transmission is a new uplink transmission or a retransmitted uplink transmission.

Figure 8:
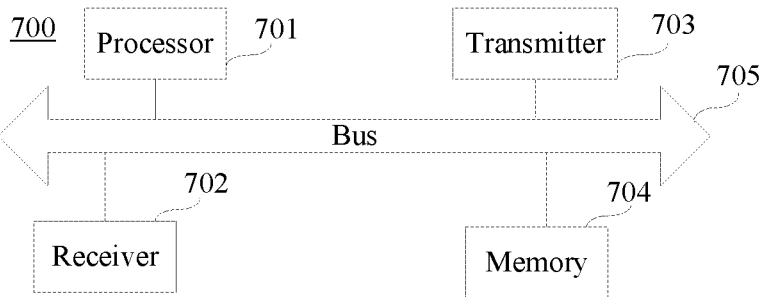
FIG. 8 is a block diagram showing a terminal according to an embodiment.

FIG. 8 is a block diagram showing a terminal 700 according to an embodiment, and the terminal 700 may include: a processor 701, a receiver 702, a transmitter 703, a memory 704 and a bus 705.

The processor 701 includes one or more processing cores, and the processor 701 executes various functional applications and information processing by running software programs and modules.

The receiver 702 and the transmitter 703 may be implemented as a communication component, and the communication component may be a communication chip.

The memory 704 is connected to the processor 701 through the bus 705. The memory 704 may be configured to store at least one instruction, and the processor 701 is configured to execute the at least one instruction to implement each step in the above method embodiments. In addition, the memory 704 may be implemented using any type of volatile or non-volatile memory devices, or a combination thereof. The volatile or non-volatile memory devices include but not limited to: a magnetic or optical disk, an Electrically Erasable Programmable Read-Only Memory (EEPROM), an Erasable Programmable Read-Only Memory (EPROM), a Static Random Access Memory (SRAM), a Read-Only Memory (ROM), a magnetic memory, a flash memory and a Programmable Read-Only Memory (PROM).

In an embodiment, there is further provided a non-transitory computer-readable storage medium in which at least one instruction, at least one segment of program, a code set, or an instruction set is stored, and the at least one instruction, the at least one segment of program, the code set, or the instruction set is loaded and executed by the processor to implement the uplink transmission method provided by each of the foregoing method embodiments.

Figure 9:
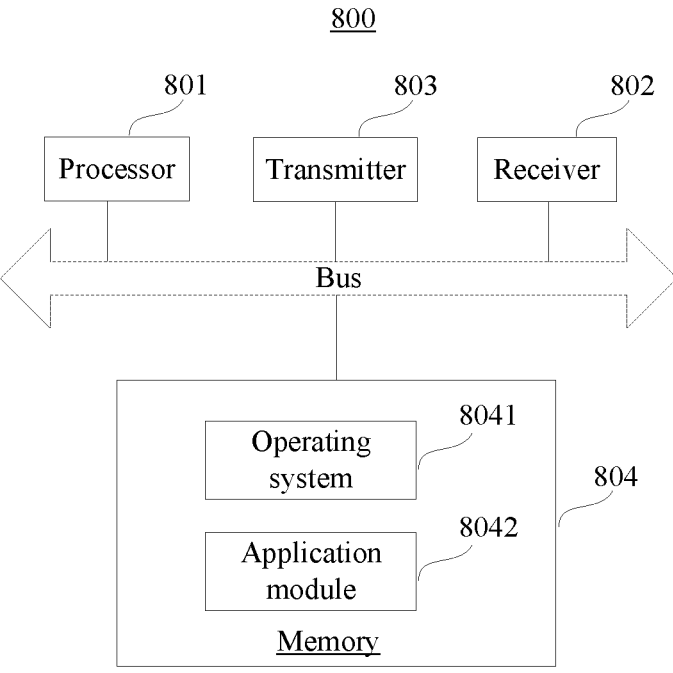
FIG. 9 is a block diagram showing an access network device according to an embodiment.

FIG. 9 is a block diagram showing an access network device 800 according to an embodiment. The access network device 800 may include: a processor 801, a receiver 802, a transmitter 803, and a memory 804. The receiver 802, the transmitter 803, and the memory 804 are respectively connected to the processor 801 through a bus.

The processor 801 includes one or more processing cores, and the processor 801 executes the method executed by the access network device in the uplink transmission method provided by the embodiments of the present disclosure by running software programs and modules. The memory 804 may be configured to store the software programs and modules. In detail, the memory 804 may store an operating system 8041 and an application module 8042 required by at least one function. The receiver 802 is configured to receive communication data sent by other devices, and the transmitter 803 is configured to send the communication data to other devices.

In an embodiment, there is further provided a computer-readable storage medium in which at least one instruction, at least one segment of program, a code set, or an instruction set is stored, and the at least one instruction, the at least one segment of program, the code set, or the instruction set is loaded and executed by the processor to implement the uplink transmission method provided by each of the foregoing method embodiments.

The embodiments of the present disclosure further provide an uplink transmission system, and the uplink transmission system includes a terminal and an access network device. The terminal is the terminal provided by the embodiment shown in FIG. 8, and the access network device is the access network device provided by the embodiment shown in FIG. 9.

Embodiments of the present disclosure provide an uplink transmission method and apparatus, an access network device, a terminal and a storage medium.

According to an aspect of the embodiments of the present disclosure, there is provided an uplink transmission method, and the method includes receiving identical uplink transmissions sent by a terminal through a plurality of HARQ processes, and combining the uplink transmissions sent through the plurality of HARQ processes.

In some embodiments of the present disclosure, the combining the uplink transmissions sent through the plurality of HARQ processes includes determining HARQ processes belonging to the same HARQ process bundle, and combining the uplink transmissions sent through the HARQ processes belonging to the same HARQ process bundle.

In some embodiments of the present disclosure, the method further includes sending a control instruction for indicating the HARQ processes belonging to the same HARQ process bundle to the terminal.

In some embodiments of the present disclosure, the control instruction includes a HARQ process bundle size, wherein the HARQ process bundle size is used to indicate the terminal to divide the plurality of HARQ processes into at least one HARQ process bundle according to the HARQ process bundle size, the control instruction includes a HARQ process number belonging to the same HARQ process bundle, or the control instruction includes indicating an uplink transmission transmitted by a HARQ process and the HARQ processes transmitting the identical uplink transmissions belonging to the same HARQ process bundle.

In some embodiments of the present disclosure, the sending the control instruction for indicating the HARQ processes belonging to the same HARQ process bundle to the terminal includes sending a PDCCH carrying the control instruction to the terminal.

In some embodiments of the present disclosure, the sending the PDCCH carrying the control instruction to the terminal includes sending the PDCCH to the terminal in the plurality of HARQ processes, respectively, wherein the control instruction carried by the PDCCH sent in the plurality of HARQ processes indicates the terminal to transmit the identical uplink transmissions.

In some embodiments of the present disclosure, new/old data indication in the PDCCH sent in the plurality of HARQ processes is the same, and the new/old data indication is used to indicate that the transmitted uplink transmission is a new uplink transmission or a retransmitted uplink transmission.

According to an aspect of the embodiments of the present disclosure, there is provided an uplink transmission method, and the method includes determining an uplink transmission to be transmitted, and sending the uplink transmission to be transmitted through a plurality of HARQ processes, wherein the uplink transmission transmitted through the plurality of HARQ processes is the same.

In some embodiments of the present disclosure, the sending the uplink transmission to be transmitted through the plurality of HARQ processes includes determining HARQ processes belonging to the same HARQ process bundle, and sending the uplink transmission to be transmitted through the HARQ processes belonging to the same HARQ process bundle.

In some embodiments of the present disclosure, the determining the HARQ processes belonging to the same HARQ process bundle includes receiving a control instruction for indicating the HARQ processes belonging to the same HARQ process bundle.

In some embodiments of the present disclosure, the control instruction includes a HARQ process bundle size, wherein the HARQ process bundle size is used to indicate the terminal to divide the plurality of HARQ processes into at least one HARQ process bundle according to the HARQ process bundle size, the control instruction includes a HARQ process number belonging to the same HARQ process bundle, or the control instruction includes indicating an uplink transmission transmitted by a HARQ process and the HARQ processes transmitting the same uplink transmission belonging to the same HARQ process bundle.

In some embodiments of the present disclosure, the receiving the control instruction for indicating the HARQ processes belonging to the same HARQ process bundle includes receiving a PDCCH carrying the control instruction.

In some embodiments of the present disclosure, the receiving the PDCCH carrying the control instruction includes receiving the PDCCH in the plurality of HARQ processes, respectively, wherein the control instruction carried by the PDCCH sent in the plurality of HARQ processes indicates a terminal to transmit the same uplink transmission.

In some embodiments of the present disclosure, new/old data indication in the PDCCH sent in the plurality of HARQ processes is the same, and the new/old data indication is used to indicate that the transmitted uplink transmission is a new uplink transmission or a retransmitted uplink transmission.

According to an aspect of the embodiments of the present disclosure, there is provided an uplink transmission apparatus, and the apparatus includes a receiving module, configured to receive identical uplink transmissions sent by a terminal through a plurality of HARQ processes, and a processing module, configured to combine the uplink transmissions sent through the plurality of HARQ processes.

According to an aspect of the embodiments of the present disclosure, there is provided an uplink transmission apparatus, and the apparatus includes an obtaining module, configured to determine an uplink transmission to be transmitted, and a sending module, configured to send the uplink transmission to be transmitted through a plurality of HARQ processes, wherein the uplink transmission transmitted through the plurality of HARQ processes is the same.

According to another aspect of the embodiments of the present disclosure, there is provided an access network device, including a processor and a memory configured to store executable instructions of the processor. The processor being configured to load and execute the executable instructions to implement the uplink transmission method described above.

According to another aspect of the embodiments of the present disclosure, there is provided a terminal, including a processor and a memory configured to store executable instructions of the processor. The processor is configured to load and execute the executable instructions to implement the uplink transmission method described above.

According to another aspect of the embodiments of the present disclosure, there is provided a non-transitory computer-readable storage medium, wherein instructions in the computer-readable storage medium, when executed by a processor, is capable of implementing the uplink transmission method described above.

In the embodiments of the present disclosure, the access network device simultaneously schedules and generates the plurality of HARQ processes to transmit the identical uplink transmissions, and combines the uplink transmissions sent through the plurality of HARQ processes to improve the probability of correct decoding of information. In this way, on the one hand, the transmission latency can be reduced, and on the other hand, the uplink transmission quality can be improved, thereby enhancing the coverage of an uplink service channel.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common general knowledge or conventional technical means in the art that are not disclosed in the present disclosure.

It should be understood that the present disclosure is not limited to the precise structures that have been described above and shown in the drawings, and various modifications and changes can be made without departing from the scope thereof.

What is claimed is:

1. An uplink transmission method, comprising:
sending a Physical Downlink Control Channel (PDCCH) carrying a control instruction to a terminal in a plurality of Hybrid Automatic Repeat reQuest (HARQ) processes, respectively, wherein the control instruction carried by the PDCCH sent in the plurality of HARQ processes indicates the terminal to transmit identical uplink transmissions, the control instruction comprises a HARQ process bundle size, the HARQ process bundle size is configured to indicate the terminal to divide, according to the HARQ process bundle size, a plurality of HARQ processes of the terminal into at least one HARQ process bundle, and each HARQ process bundle comprises at least two HARQ processes, the number of HARQ processes in the HARQ process bundle is increased based on increased errors in uplink transmissions of the terminal;
receiving the identical uplink transmissions sent by the terminal through the plurality of HARQ processes of the terminal; and
combining the identical uplink transmissions sent through the plurality of HARQ processes of the terminal.

2. The method according to claim 1, wherein combining the identical uplink transmissions sent through the plurality of HARQ processes of the terminal comprises:
determining HARQ processes belonging to a same HARQ process bundle; and combining the identical uplink transmissions sent through the HARQ processes belonging to the same HARQ process bundle.

3. The method according to claim 1, wherein new/old data indication in the PDCCH sent in each of the plurality of HARQ processes is provided with a same identification value, and the new/old data indication is used to indicate that an uplink transmission that is transmitted is a new uplink transmission or a retransmitted uplink transmission.

4. An uplink transmission method, comprising:
receiving a Physical Downlink Control Channel (PDCCH) carrying a control instruction in a plurality of Hybrid Automatic Repeat reQuest (HARQ) processes, respectively, wherein the control instruction carried by the PDCCH received in the plurality of HARQ processes indicates a terminal to transmit identical uplink transmissions, the control instruction comprises a HARQ process bundle size, the HARQ process bundle size is configured to indicate the terminal to divide, according to the HARQ process bundle size, the plurality of HARQ processes into at least one HARQ process bundle, and each HARQ process bundle comprises at least two HARQ processes, the number of HARQ processes in the HARQ process bundle is increased based on increased errors in uplink transmissions of the terminal;
determining an uplink transmission to be transmitted; and
sending the uplink transmission to be transmitted through the plurality of HARQ processes, wherein uplink transmissions transmitted through the plurality of HARQ processes are identical.

5. The method according to claim 4, wherein sending the uplink transmission to be transmitted through the plurality of HARQ processes comprises:
determining HARQ processes belonging to a same HARQ process bundle; and
sending the uplink transmission to be transmitted through the HARQ processes belonging to the same HARQ process bundle.

6. The method according to claim 4, wherein new/old data indication in the PDCCH sent in each of the plurality of HARQ processes is provided with a same identification value, and the new/old data indication is used to indicate that an uplink transmission that is transmitted is a new uplink transmission or a retransmitted uplink transmission.

7. A terminal, comprising:

a processor; and a memory, configured to store executable instructions of the processor; wherein the processor is configured to load and execute the executable instructions to implement the uplink transmission method according to claim 4.

8. An access network device, comprising:

a processor; and a memory, configured to store executable instructions of the processor;

wherein the processor is configured to load and execute the executable instructions to implement an uplink transmission method, comprising:

sending a Physical Downlink Control Channel (PDCCH) carrying a control instruction to a terminal in a plurality of Hybrid Automatic Repeat reQuest (HARQ) processes, respectively, wherein the control instruction carried by the PDCCH sent in the plurality of HARQ processes indicates the terminal to transmit identical uplink transmissions, the control instruction comprises a HARQ process bundle size, the HARQ process bundle size is configured to indicate the terminal to divide, according to the HARQ process bundle size, a plurality of HARQ processes of the terminal into at least one HARQ process bundle, and each HARQ process bundle comprises at least two HARQ processes, the number of HARQ processes in the HARQ process bundle is increased based on increased errors in uplink transmissions of the terminal;

receiving the identical uplink transmissions sent by the terminal through the plurality of HARQ processes of the terminal; and combining the identical uplink transmissions sent through the plurality of HARQ processes of the terminal.

9. The access network device according to claim 8, wherein the processor is further configured to:

determine HARQ processes belonging to a same HARQ process bundle; and combine the identical uplink transmissions sent through the HARQ processes belonging to the same HARQ process bundle.

10. The access network device according to claim 8, wherein new/old data indication in the PDCCH sent in each of the plurality of HARQ processes is provided with a same identification value, and the new/old data indication is used to indicate that an uplink transmission that is transmitted is a new uplink transmission or a retransmitted uplink transmission.

* * * * *